(12) United States Patent
Xie et al.

(10) Patent No.: US 8,497,863 B2
(45) Date of Patent: Jul. 30, 2013

(54) GRAPH SCALABILITY

(75) Inventors: Yin Xie, Bellevue, WA (US); Chris D. Karkanias, Sammamish, WA (US); George G. Robertson, Northeast Harbor, ME (US)

(73) Assignee: Microsoft Corporation, Redmond, WA (US)

( * ) Notice: Subject to any disclaimer, the term of this patent is extended or adjusted under 35 U.S.C. 154(b) by 683 days.

(21) Appl. No.: 12/477,926

(22) Filed: Jun. 4, 2009

(65) Prior Publication Data

US 2010/0309206 A1 Dec. 9, 2010

(51) Int. Cl.
*G06T 11/20* (2006.01)
*G06F 7/00* (2006.01)

(52) U.S. Cl.
USPC . 345/440; 707/798; 707/999.1; 707/999.102; 707/797; 707/800; 345/501; 345/619; 382/225; 382/226

(58) Field of Classification Search
USPC ............... 345/440–443, 501, 619; 707/999.1, 707/797, 798, 800, 999.001–999.009, 999.01, 707/999.101–999.107; 382/225–226
See application file for complete search history.

(56) References Cited

U.S. PATENT DOCUMENTS

| | | | |
|---|---|---|---|
| 5,450,535 A | 9/1995 | North | |
| 6,437,804 B1 * | 8/2002 | Ibe et al. | 715/736 |
| 6,781,599 B2 | 8/2004 | Abello et al. | |
| 6,807,557 B1 * | 10/2004 | Novaes et al. | 709/201 |
| 7,225,183 B2 | 5/2007 | Gardner | |
| 2004/0177244 A1 * | 9/2004 | Murphy et al. | 713/100 |
| 2006/0036615 A1 * | 2/2006 | Masselle et al. | 707/100 |
| 2006/0037019 A1 * | 2/2006 | Austin et al. | 718/100 |
| 2006/0074836 A1 | 4/2006 | Gardner et al. | |
| 2006/0290697 A1 * | 12/2006 | Madden et al. | 345/440 |
| 2008/0263022 A1 * | 10/2008 | Kostorizos et al. | 707/5 |
| 2008/0281959 A1 * | 11/2008 | Robertson | 709/224 |
| 2008/0294644 A1 | 11/2008 | Liu et al. | |

OTHER PUBLICATIONS

Nachmanson, et al."Drawing Graphs with GLEE ", Retrieved at<<ftp://ftp.research.microsoft.com/pub/tr/TR-2007-72.pdf>>, pp. 1-12.

Nikolov, et al."Graph Layering by Promotion of Nodes ", Retrieved at<<http://www.csis.ul.ie/Research/Techrpts/UL-CSIS-02-2.ps>>, Nov. 29, 2002, pp. 16.

(Continued)

*Primary Examiner* — Wesner Sajous
*Assistant Examiner* — Andrew Shin
(74) *Attorney, Agent, or Firm* — Gonzalez Saggio & Harlan LLP

(57) ABSTRACT

Described is a technology for reducing the layout complexity of a graph, e.g., an STT graph. Nodes with similar incoming and outgoing links are grouped as candidate groupings to possibly be clustered. For each candidate grouping, if the nodes in the candidate grouping and/or the candidate grouping meet clustering criteria, the candidate grouping is clustered into a clustered node. The criteria may include user-specified parameters directed towards the nodes and/or the candidate groupings. For example, a node is removed from a group if the number of incoming links thereto or the number of outgoing links therefrom exceed maximum incoming and outgoing parameter values, respectively. A group is only clustered if the number of nodes therein meets a minimum size parameter.

17 Claims, 6 Drawing Sheets

OTHER PUBLICATIONS

Garg, et al."GIOTTO3D: A System for Visualizing Hierarchical Structures in 3D*", Retrieved at<<http://www.cs.brown.edu/cgc/papers/gt-gsvhs-97.ps.gz>>, pp. 8.

Eades, et al."Straight-Line Drawing Algorithms for Hierarchical Graphs and Clustered Graphs", Retrieved at<<http://citeseerx.ist.psu.edu/viewdoc/summary;jsessionid=1CA375AA260EE1BA03E41CA0A6826B45?doi=10.1.1.25.8223>>, Jun. 29, 1999, pp. 1-33.

Pavagada, et al."OntologyVisualization", Retrieved at <<http://lsdis.cs.uga.edu/~ravi/home/userGuide.pdf>>, pp. 10.

* cited by examiner

GRAPH SCALABILITY

BACKGROUND

Browsing a large graph, such as ontology graph, is a challenge because of its size. One well-known technique is based upon directed graph drawing and a layout schema, and is referred to as Sugiyama's scheme (STT).

One feature of STT that researchers find attractive is its ability to provide well organized graphs with labels. However, when dealing with graphs that are too large, very few of the graph's nodes can be displayed on a rendering surface, whereby the viewer can quickly become disoriented within the graph.

Moreover, STT imposes a significant performance penalty. For example, when dealing with a number of nodes and links each on the order of thousands, contemporary computer systems need over a minute to perform STT layout; one example of 2827 nodes and 4734 links took approximately one-and-a half minutes to perform layout. The time tends to increase exponentially as nodes and links increase. STT is thus not suitable for a large ontology graph with thousands or tens of thousands of nodes and links.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which nodes to be graphed may be clustered together into a clustered node, (thereby reducing the number of total nodes and links to be graphed, for example). In general, nodes with similar incoming and outgoing links are grouped as candidate groupings to possibly be clustered. For each candidate grouping, if the nodes in the candidate grouping and/or the candidate grouping meet criteria, which may be user-specified parameters, the candidate grouping is clustered into a clustered node.

In one aspect, the parameters for removing a node from a group or leaving that node in a group include a maximum incoming link parameter; nodes with a number of incoming links that exceed this value are removed from the group. Another parameter is a maximum outgoing link parameter; nodes with a number of outgoing links that exceed this value are removed from the group.

A parameter for whether to cluster a candidate group of nodes is a minimum size parameter. If a candidate group has a sufficient number of nodes as specified by the minimum size parameter, (e.g., after removing any nodes based on maximum link criteria), the group is clustered, otherwise it is not.

In one aspect, the clustered nodes and non-clustered nodes, along with their link data, are provided to an STT-based layout mechanism for rendering as a graph, e.g., an ontology graph.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards resolving the scalability and the performance issues of STT with respect to large graphs, while at the same time providing improved visibility for users. To this end, nodes that have incoming links from the same source and outgoing links to the same target may be clustered together into a clustered node, in accordance with user-specified parameters. The non-clustered nodes and clustered nodes are then provided to the STT layout mechanism for rendering. With large ontology graphs and the like, many such nodes are clustered, whereby the total of nodes that are rendered is significantly reduced. This improves the scalability and performance of STT, and further helps the user visualize (and remain oriented within) the graph.

While the examples herein are described in the context of an ontology graph rendered using the STT layout scheme, it is understood these are only examples, and that other large graphs may benefit from the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and data rendering in general.

Figure 1:
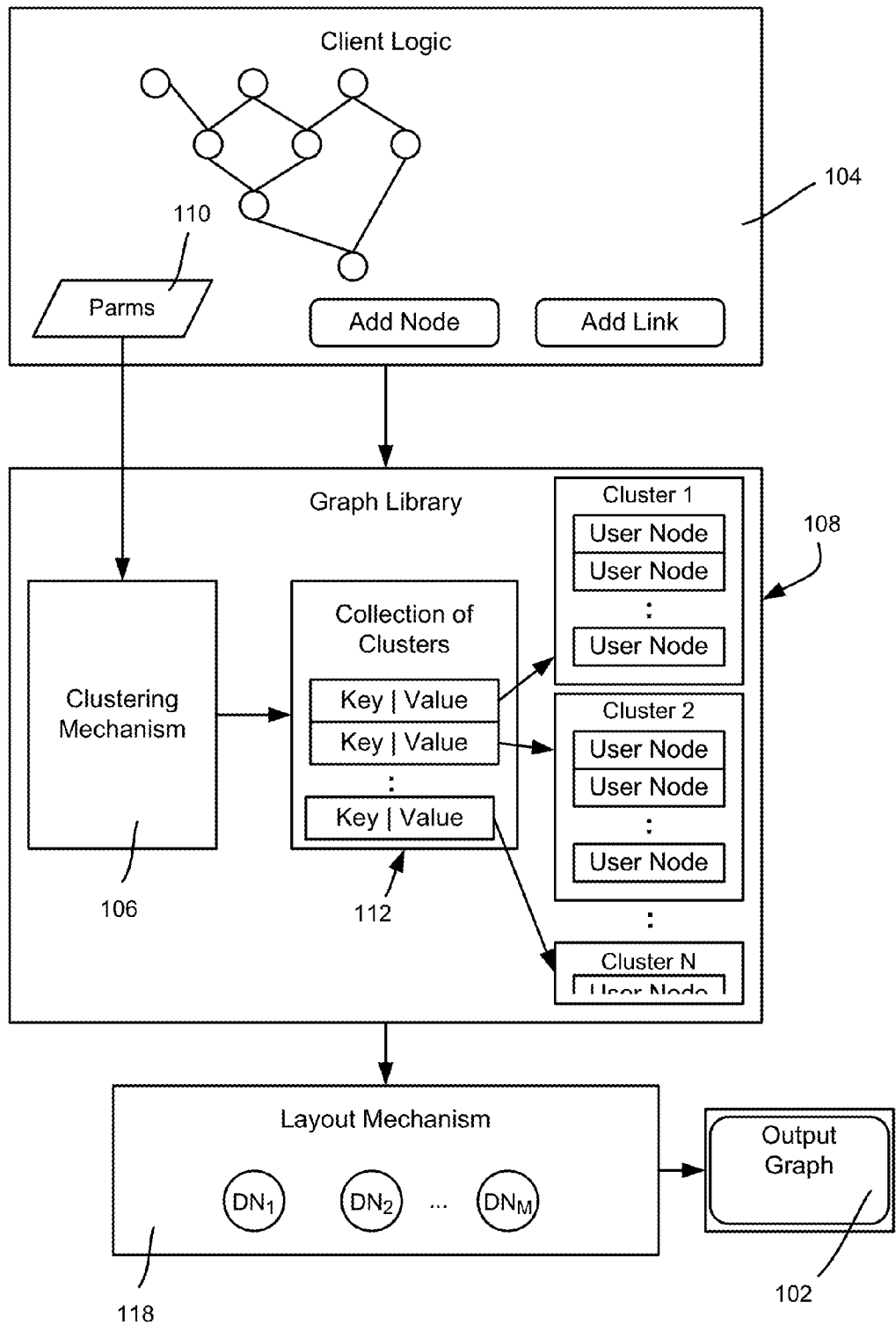
FIG. 1 is a block diagram showing example components for clustering some nodes into clustered nodes for layout in a graph.
Figure 2:
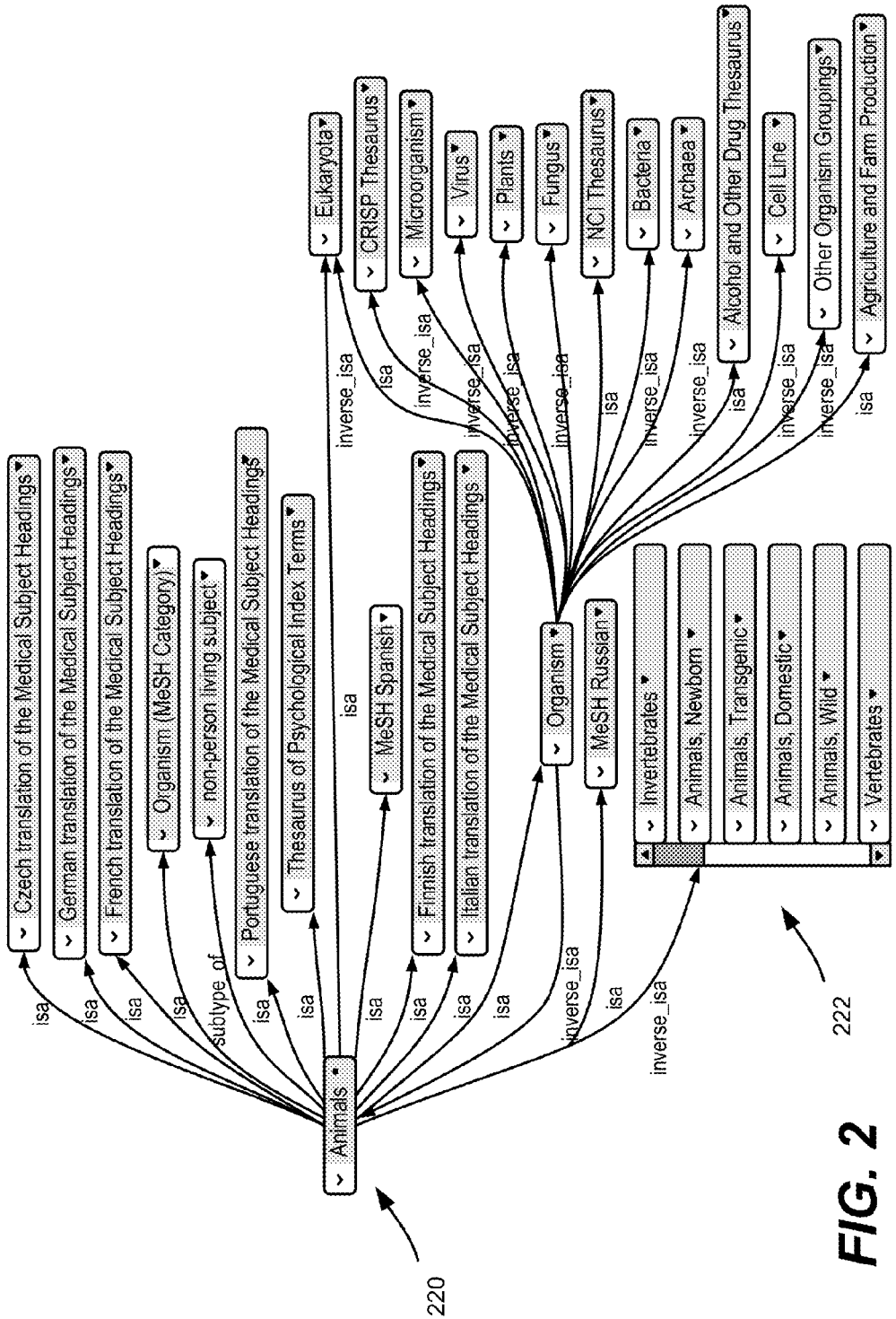
FIG. 2 is a representation of a graph including a clustered node.

Turning to FIG. 1, there is shown a general block diagram representing various components for rendering a graph 102. In general, client logic 104 assists a user in building or modifying a graph, e.g., by adding nodes and links. In an ontology graph, each node represents some concept, while the links represent relationships between those concepts, as generally represented in FIG. 2.

To reduce the number of nodes, and thus the number of links, certain nodes may be clustered together as described herein, namely those nodes that have similar incoming links and similar outgoing links. Note that clustering thus works well with graphs having many similar nodes linked to the same sources, which is a common characteristic of many types of ontology graphs such as Unified Medical Language System (UMLS) graphs.

To cluster nodes, a clustering mechanism 106 of a graph library 108 operates to obtain grouping candidates comprising nodes having similar incoming and outgoing links. Then, based upon user-provided (or default) parameters 110 as described below, the candidates that meet the parameters are clustered into a collection of clusters 112. Note that in one implementation the graph library is implemented as a dynamic link library used by the process that runs the client logic.

As generally represented in FIG. 1, in one implementation each cluster in the collection 112 is identified by a key, value pair, in which the key identifies the cluster for layout (as a node identifier), and the value points to the array of identifiers for the user nodes that were clustered together. In this manner, given a clustered node identifier, its individual nodes may be found.

Once clustered, the regular, non-clustered nodes and the clustered nodes are provided in a known manner to a layout mechanism 118, which puts together display nodes (e.g., $DN_1$-$DN_M$) for output. The layout mechanism then outputs the graph 102. Note that the layout process that arranges the nodes and links is known technology (e.g., as described in U.S. Patent Application Pub. No. US 2008/0291203) and thus is not described herein, except to note that the way in which regular nodes and non-clustered nodes appear when rendered may be different, e.g., according to a desired styling/model.

With respect to STT rendering, once a clustered node is created, the nodes inside the cluster are treated as a single clustered node inside the STT schema. The clustered nodes are displayed inside a virtualized items control so that only the visible nodes are actually allocated, laid out and displayed. As a result, the total number of nodes on the screen is determined by the parameters and the visual size of the clusters.

By way of example, FIG. 2 shows a regular node 220 with outgoing links to other nodes. The node 222 is a clustered node which may appear differently in some way so that the user recognizes it as such. In the example of FIG. 2 a scrollbar accompanies the clustered node 222, however it is understood that a scrollbar may not be present for clustered nodes with smaller numbers of nodes clustered therein, and that any suitable visible indication may be used, e.g., an outline around the clustered node, a different color scheme, and so forth. Note that in FIG. 2 the incoming links to the clustered node are the same for each node represented therein; there are no outgoing links from any of the represented nodes (no links is considered similar).

Figure 3:
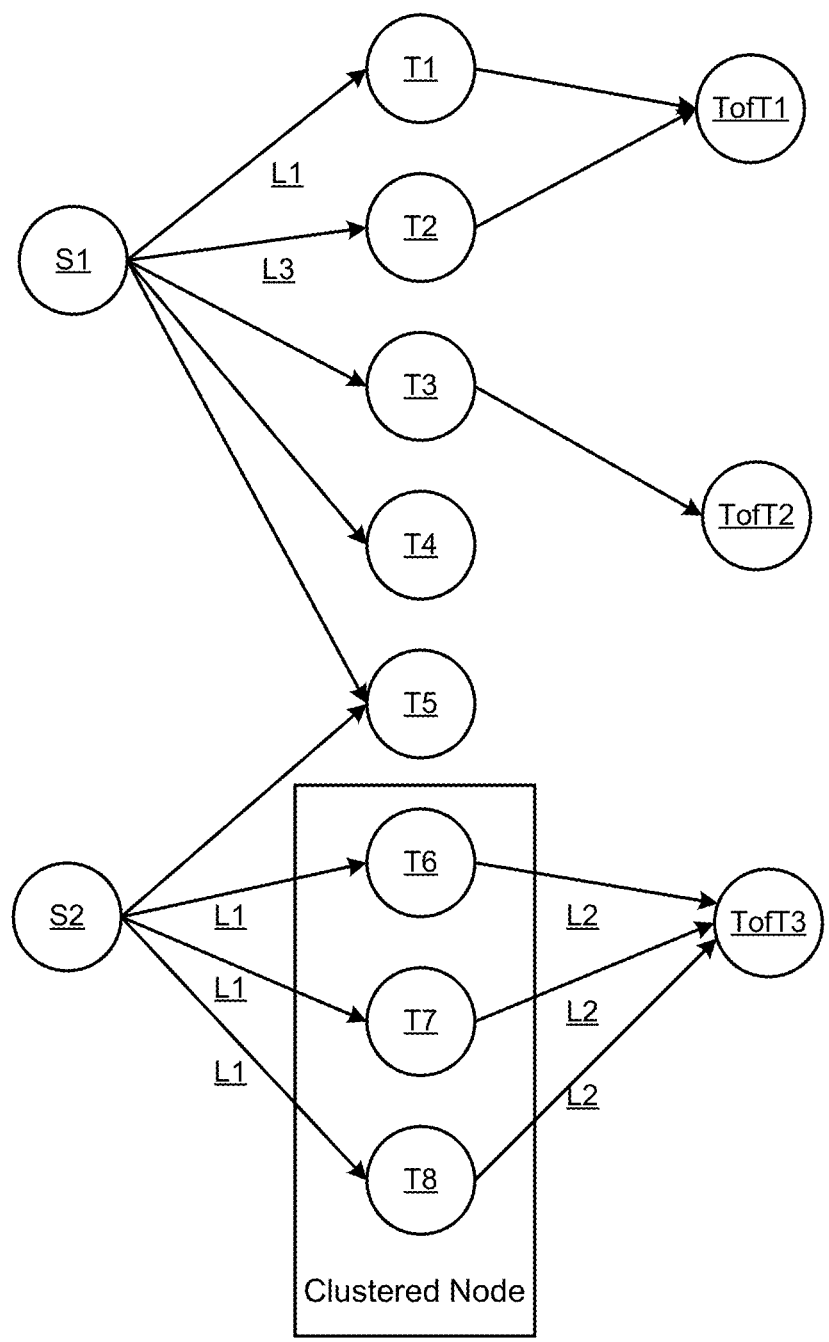
FIG. 3 is a representation of nodes and links between nodes, in which nodes with similar links may be clustered into a clustered node.

FIG. 3 shows aspects of clustering nodes based on similar incoming and outgoing links. In FIG. 3, the source node S2 points to four target nodes T5-T8. Nodes T6-T8 point to the same target-of-the-target node TofT3. Further, the links are the same type of links. Thus, nodes T6-T8 may be clustered into a clustered node. As can be readily appreciated, the clustering mechanism finds such nodes by the identifiers of links, the link or links from a source into the target, the link or links out of a target and the node identifier of the target of the target.

Note that the target node T5 does not have the same target-of-the-target node TofT3, and thus is not clustered with the nodes T6-T8. Also, links T1 and T2 are not clustered because they have different incoming link identifiers.

The parameters 110 give the user control over which grouping candidates get clustered. In general, a user can specify that a node is not to be clustered if that node has too many incoming links and/or too many outgoing links. More particularly, if a node has too many incoming links and/or too many outgoing links as specified by the user, that node is likely significant in the graph, and thus is not clustered so that it appears independently in the graph.

To this end, a "max in" parameter specifies the maximum number of incoming links to a node before that node will not be clustered. A "max out" parameter specifies the maximum number of outgoing links from a node before that node will not be clustered.

Further, a "min size" parameter may be specified. With this parameter, clustering will not occur unless a sufficient minimum number of similar nodes exist.

Figure 4:
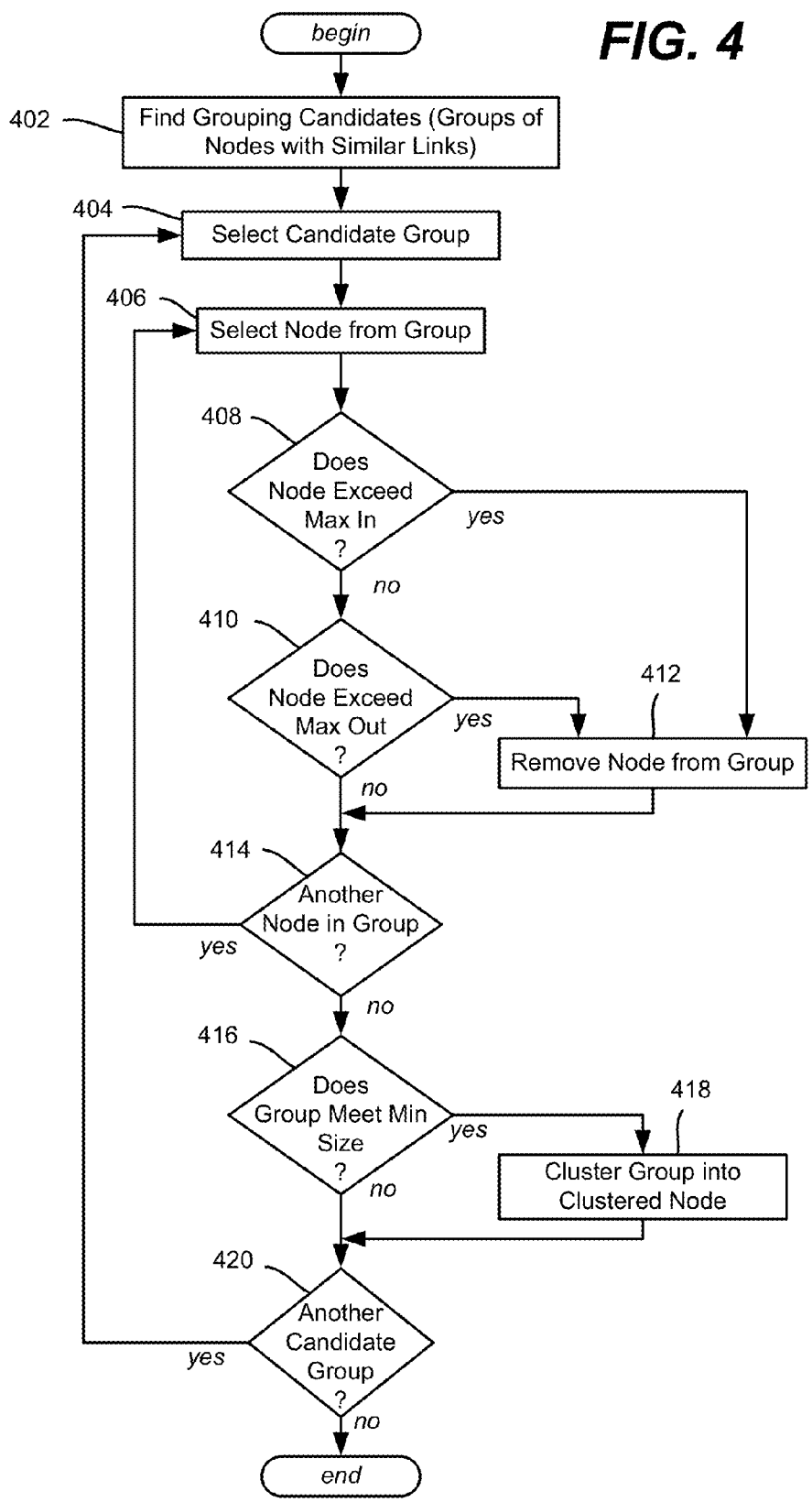
FIG. 4 is a flow diagram showing example steps taken to cluster nodes into clustered nodes.

FIG. 4 summarizes example steps that may be taken to cluster nodes, beginning at step 402 where nodes that have similar incoming links and outgoing links are grouped together into candidate groupings. Each of these candidate groups is selected and processed (via steps 404 and 420) on a per node basis (via steps 406 and 414) with respect to the parameters.

More particularly, each node of each group is evaluated with respect to its number of incoming links against the max in parameter at step 408, and evaluated with respect to its number of outgoing links with respect to the max out parameter at step 410. If the node exceeds either maximum, that node is removed from the group.

When the nodes of a group are processed as determined by step 414, the number of remaining nodes is evaluated against the min size parameter. If enough nodes are present, the group is clustered into a clustered node at step 418, e.g., the nodes identifiers are put into an array that is locatable via a cluster node ID (key) and array pointer (value) pair.

Step 420 repeats the process until the candidate groups have been processed in this manner.

Figure 5:
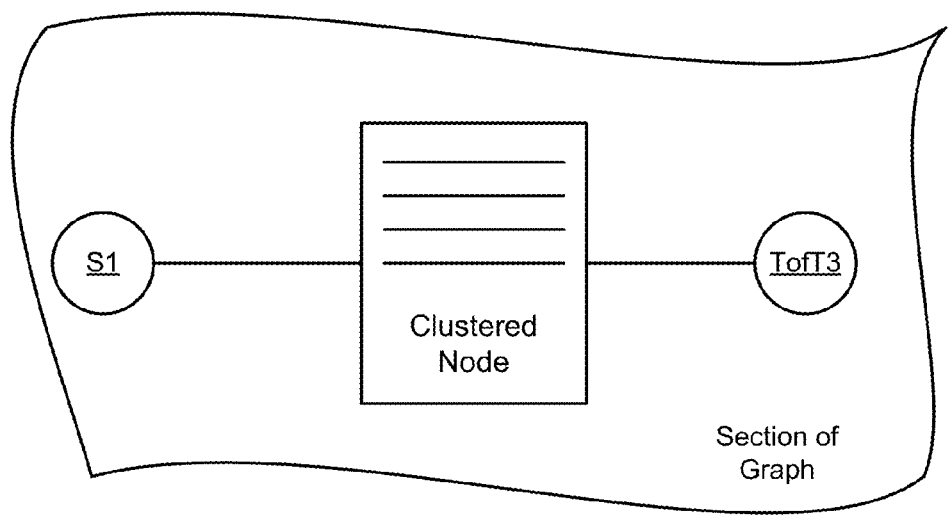
FIG. 5 is a representation of how a clustered node may appear between two other nodes.

FIG. 5 shows how a clustered node may appear between a source node and a target-of-the-target nodes of the clustered nodes. As described above, the representation of the clustered node may be scrollable, and/or otherwise may be visibly different so as to be recognizable to the user/viewer. Note that a clustered node may be linked to another clustered node, e.g., S1 and/or TofT3 in FIG. 5 may be a clustered node.

Figure 6:
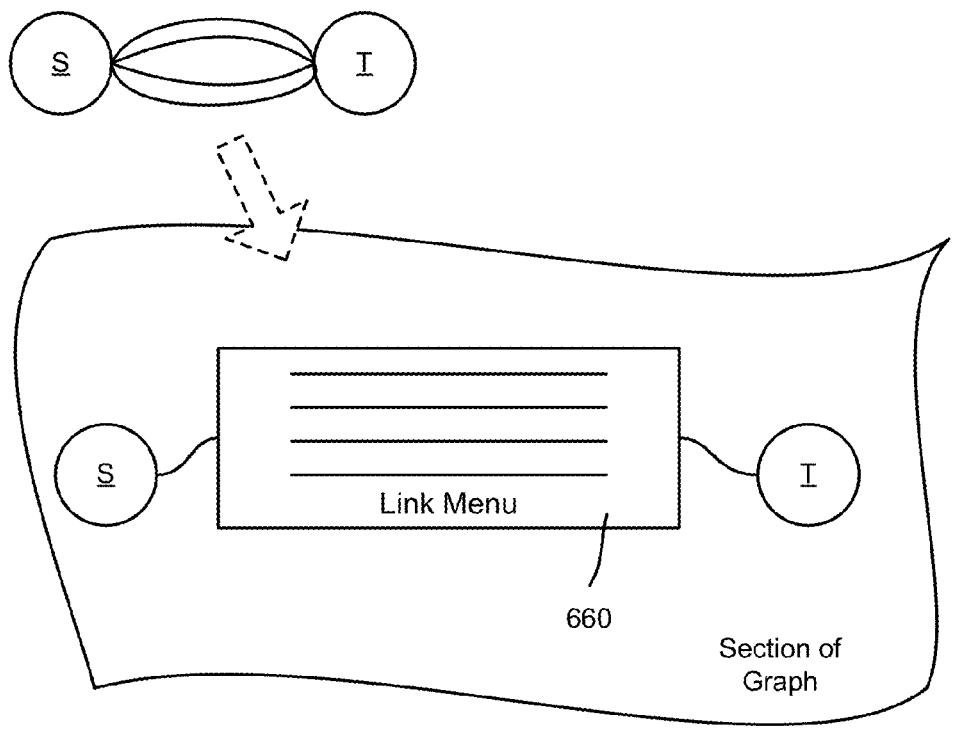
FIG. 6 is a representation of how links may be combined into a link menu between two nodes.

FIG. 6 is directed to another, optional aspect, namely combining links. In general, if a source has a sufficient number of links to a target, the links may be represented by a link menu 660 or the like so that each link need not be individually displayed. Such a link menu may be scrollable.

Exemplary Operating Environment

Figure 7:
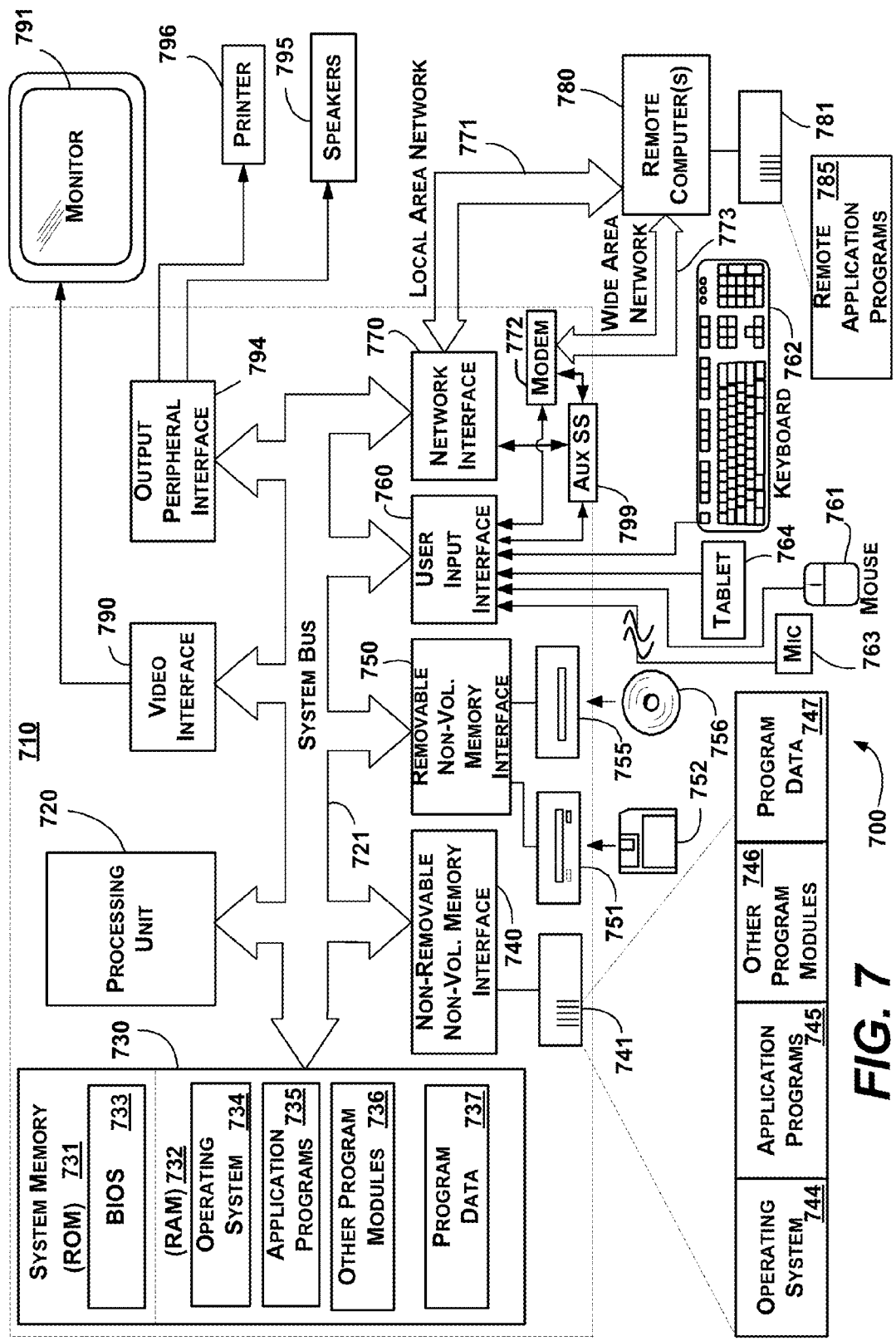
FIG. 7 shows an illustrative example of a computing environment into which various aspects of the present invention may be incorporated.

FIG. 7 illustrates an example of a suitable computing and networking environment 700 on which the examples of FIGS. 1-6 may be implemented. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment 700.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the invention may include a general purpose computing device in the form of a computer 710. Components of the computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 710 typically includes a variety of computer-readable media. Computer-readable media can be any available media that can be accessed by the computer 710 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 710. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736 and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media, described above and illustrated in FIG. 7, provide storage of computer-readable instructions, data structures, program modules and other data for the computer 710. In FIG. 7, for example, hard disk drive 741 is illustrated as storing operating system 744, application programs 745, other program modules 746 and program data 747. Note that these components can either be the same as or different from operating system 734, application programs 735, other program modules 736, and program data 737. Operating system 744, application programs 745, other program modules 746, and program data 747 are given different numbers herein to illustrate that, at a minimum, they are different copies. A user may enter commands and information into the computer 710 through input devices such as a tablet, or electronic digitizer, 764, a microphone 763, a keyboard 762 and pointing device 761, commonly referred to as mouse, trackball or touch pad. Other input devices not shown in FIG. 7 may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. The monitor 791 may also be integrated with a touch-screen panel or the like. Note that the monitor and/or touch screen panel can be physically coupled to a housing in which the computing device 710 is incorporated, such as in a tablet-type personal computer. In addition, computers such as the computing device 710 may also include other peripheral output devices such as speakers 795 and printer 796, which may be connected through an output peripheral interface 794 or the like.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more local area networks (LAN) 771 and one or more wide area networks (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760 or other appropriate mechanism. A wireless networking component 774 such as comprising an interface and antenna may be coupled through a suitable device such as an access point or peer computer to a WAN or LAN. In a networked environment, program modules depicted relative to the computer 710, or portions thereof, may be stored in the remote memory storage device. By way of example, and not limitation, FIG. 7 illustrates remote application programs 785 as residing on memory device 781. It may be appreciated that the network connections shown are exemplary and other means of establishing a communications link between the computers may be used.

An auxiliary subsystem 799 (e.g., for auxiliary display of content) may be connected via the user interface 760 to allow data such as program content, system status and event notifications to be provided to the user, even if the main portions of the computer system are in a low power state. The auxiliary subsystem 799 may be connected to the modem 772 and/or network interface 770 to allow communication between these systems while the main processing unit 720 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents failing within the spirit and scope of the invention.

What is claimed is:

1. In a computing environment, a method comprising:
obtaining a plurality of nodes;
grouping one or more nodes from the plurality of nodes as a candidate grouping, wherein the one or more nodes of the candidate grouping have at least one of a similar incoming or outgoing link, wherein the at least one of a similar incoming or outgoing link includes a link identifier, and wherein each of the one or more nodes of the candidate grouping has a similar link identifier;
determining whether each of the one or more nodes in the candidate grouping is within a parameter, wherein the parameter is at least one of a maximum incoming parameter or a maximum outgoing parameter, and wherein determining whether the each of the one or more nodes in the candidate grouping is within the parameter comprises at least one of determining whether the each node of the one or more nodes in the candidate grouping has a number of incoming links from a same source that exceeds the maximum incoming parameter or determining whether the each node of the one or more nodes in the candidate grouping has a number of outgoing links to a same target that exceeds the maximum outgoing parameter;
responsive to each of the one or more nodes in the candidate grouping being within the parameter, clustering the one or more nodes in the candidate grouping into a clustered node;
providing the clustered node and one or more non-clustered nodes for graph layout to represent the plurality of nodes.

2. The method of claim 1 further comprising:
responsive to a node of the one or more nodes in the candidate grouping being outside the parameter, removing the node from the candidate grouping and clustering the one or more nodes remaining in the candidate grouping into the clustered node.

3. The method of claim 1 further comprising:
determining that the number of nodes in the candidate grouping is not less than a minimum node parameter.

4. The method of claim 1 further comprising:
assigning a clustered node identifier to the clustered node, wherein the clustered node identifier includes a key and a value, and wherein the key identifies a cluster and the value points to an array of node identifiers that correspond to individual nodes within the cluster.

5. The method of claim 1 wherein determining whether each of the one or more nodes in the candidate grouping is within a parameter further comprises:
receiving a user-specified maximum incoming parameter, a user-specified maximum outgoing parameter, and a user-specified minimum size parameter;
determining whether each node in the candidate grouping has a number of incoming links that exceeds the user-specified maximum incoming parameter:
responsive to a determination that any node in the candidate grouping has a number of incoming links that exceeds the user-specified maximum incoming parameter, removing that node from the candidate grouping;
determining whether each node in the candidate grouping has a number of outgoing links that exceeds the user-specified maximum outgoing parameter;
responsive to a determination that any node in the candidate grouping has a number of outgoing links that exceeds the user-specified maximum outgoing parameter, removing that node from the candidate grouping; and
determining that the number of remaining nodes in the candidate grouping is not less than the user-specified minimum size parameter.

6. The method of claim 1 further comprising combining a plurality of links between a source node and a target node into a link menu, and providing the link menu for graph layout to represent the plurality of links.

7. In a computing environment, a system comprising:
at least one processor;
client logic implemented on the at least one processor, the client logic configured to provide a plurality of nodes and links corresponding to a graph;
a clustering mechanism configured to locate candidate groups of nodes with similar links and link identifiers, evaluate each node of each of the candidate groups of nodes against one or more parameters to determine whether to remove that node from a group, and configured to cluster at least some of the candidate groups into clustered nodes, each clustered node representing one or more nodes of a group, wherein the one or more parameters includes at least one of a maximum incoming parameter or a maximum outgoing parameter, and wherein evaluating the each node of each of the candidate groups comprises at least one of determining whether the each node has a number of incoming links from a same source that exceeds the maximum incoming parameter or determining whether the each node has a number of outgoing links to a same target that exceeds the maximum outgoing parameter; and a layout mechanism configured to receive the clustered nodes, non-clustered nodes, and link data and configured to provide an output graph for display.

8. The system of claim 7 wherein the layout mechanism is configured to perform STT layout.

9. The system of claim 7 wherein the graph is an ontology graph.

10. The system of claim 7 wherein the clustering mechanism is configured to evaluate each candidate group against a size parameter to determine whether a candidate group has a sufficient number of nodes to cluster into a clustered node.

11. The system of claim 7 wherein the maximum incoming parameter removes any node having a number of incoming links that achieves the maximum incoming parameter value, and wherein the maximum outgoing parameter removes any node having a number of outgoing links that achieves the maximum outgoing parameter value.

12. The system of claim 11 wherein the clustering mechanism is configured to evaluate each candidate group, after removing any nodes, against a size parameter to determine whether that candidate group has a sufficient number of nodes to cluster into a clustered node.

13. The system of claim 7 wherein a clustered node is associated with an identifier for use by the layout mechanism.

14. The system of claim 7 wherein a clustered node is represented by a key, value pair, in which the key represents the cluster and the value points to an array of node identifiers that correspond to the individual nodes within that cluster.

15. One or more tangible computer-readable storage media storing computer executable instructions, which when executed perform steps, comprising:

grouping nodes with at least one of similar incoming links or similar outgoing links into one or more candidate groups, wherein the at least one of similar incoming links or similar outgoing links include link identifiers, and wherein each of the nodes of a candidate group has a similar link identifier;

for each of the one or more candidate groups:

evaluating whether each node in a candidate group meets one or more clustering criteria, including evaluating each node of the candidate group against at least one of a maximum incoming number of links parameter or a maximum outgoing number of links parameter, wherein evaluating the each node of the candidate group against at least one of a maximum incoming number of links parameter or a maximum outgoing number of links parameter comprises at least one of determining whether the each node has a number of incoming links from a same source that exceeds a maximum incoming parameter or determining whether the each node has a number of outgoing links to a same target that exceeds a maximum outgoing parameter;

in response to a determination that a node in the candidate group does not meet the one or more clustering criteria, removing the node from the candidate group; and in response to a determination that the each node in the candidate group meets the one or more clustering criteria, clustering the candidate group into a clustered node, such that a set of clustered nodes and non-clustered nodes are identified, wherein each clustered node is represented by a key, value pair, in which the key represents a cluster and the value points to an array of node identifiers that correspond to nodes within the cluster.

16. The one or more tangible computer-readable storage media of claim 15 having further computer-executable instructions comprising, providing the set of clustered nodes and the non-clustered nodes for graph layout.

17. The one or more tangible computer-readable storage media of claim 15 wherein evaluating whether each candidate group meets one or more clustering criteria comprises determining whether each candidate group has a sufficient number of nodes to cluster into a clustered node.

* * * * *